May 21, 1968     W. GRÜTTER     3,383,929

MACHINES FOR HANDLING SHEETS

Filed March 3, 1966

United States Patent Office

3,383,929
Patented May 21, 1968

1

3,383,929
MACHINES FOR HANDLING SHEETS
Walter Grütter, Prilly, Switzerland, assignor to J. Bobst et Fils S.A., Prilly, near Lausanne, Switzerland
Filed Mar. 3, 1966, Ser. No. 531,535
Claims priority, application Switzerland, Mar. 8, 1965, 3,350/65
10 Claims. (Cl. 74—53)

ABSTRACT OF THE DISCLOSURE

A drive mechanism for the chains of a press adapted for transporting sheets one by one wherein a drive pinion for the chains is driven in rotation by a toothed segment under the control of a cam mechanism such that the pinion is driven in opposite directions during active and idle strokes at respectively controlled rates.

---

The present invention relates to a machine for operating on sheets as, for example, a press for the slitting of cardboard sheets or blanks, said sheets being transported one-by-one by clamp bars conducted between two endless chains which are alternately driven and immobilized.

To obtain the above operation, a mechanism is known wherein driving wheels for the chains are rigidly secured to a coupling member which by axial displacement becomes engaged with or disengaged from a driving member, at the same time that an immobilizing means sets free or immobilizes the driving wheels of the chains. The coupling member is controlled by a fork carried by a rotatable shaft, whereas the driving member, constituted by a pinion, is alternately driven in either direction of rotation by a toothed segment to which a rocking movement is communicated.

Heretofore the toothed segment was driven from a crank arm which underwent rotary motion at uniform speed.

Such a construction requires the restriction of the drive to the motion of the crank arm.

It is an object of the invention to avoid such a restriction and to drive the toothed segment according to any desired mode of travel.

This has the advantage that the chains may be driven in correspondence with the desired accelerations and decelerations, in order to obtain the greatest production speeds.

It is an object of the invention to achieve driving of the toothed segment by cam means.

It is a further object of the invention that such cam means be constructed and arranged in order to positively drive the toothed segment in opposite directions according to a relationship favoring the highest production output of the press.

In accordance with an embodiment of the invention, the toothed segment is coupled to a rod which in turn is driven by cam means via roller means which is coupled to the rod so as to drive the toothed segment positively in opposite directions.

The cam means may be constituted by a pair of cams which are in respective peripheral contact with a roller of said roller means.

According to a further embodiment of the invention, the cam means is constituted by a single cam member having a cam surface in contact with said roller means. Preferably the roller means is constituted by a pair of rollers, each in contact with a corresponding cam surface which is formed in a track in the single cam member.

2

Figure 1:
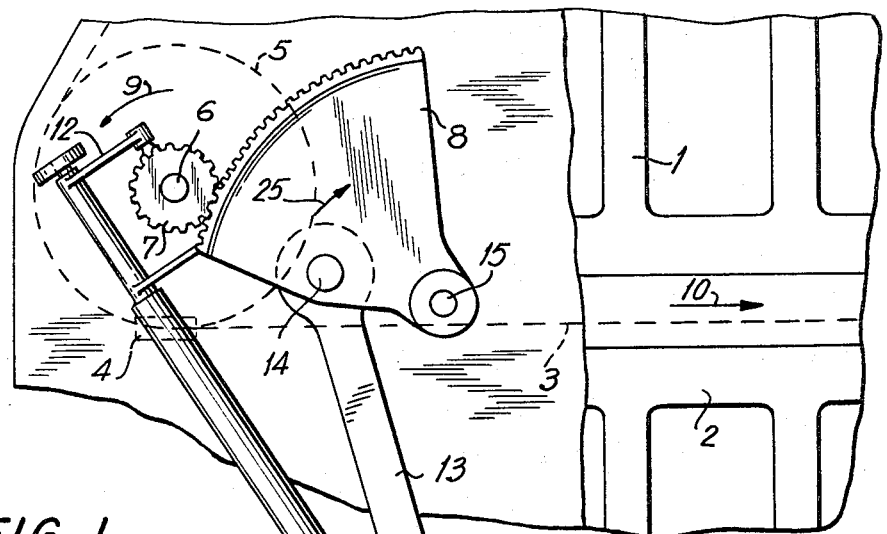
Figure 2:
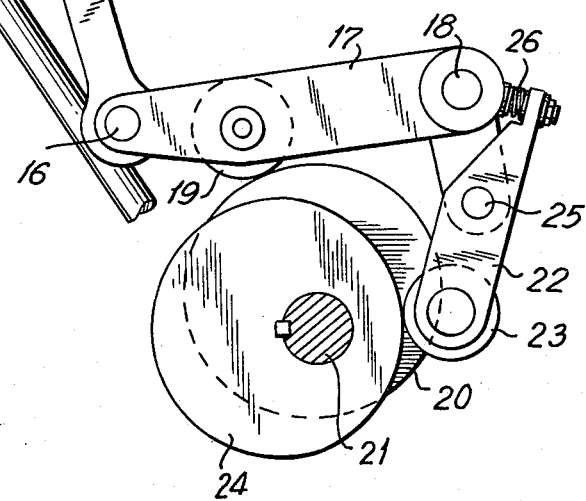
Figure 2:
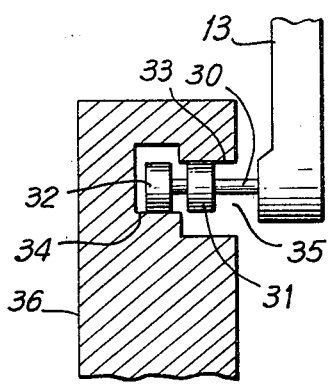

Further objects and features of the invention will become apparent from a consideration of the detailed description which follows, taken with reference to the attached drawings wherein:

FIGURE 1 is a side elevation view of a first embodiment according to the invention showing only that portion which is necessary to understand the invention; and FIGURE 2 is a sectional view taken through a single cam member according to a modified version of the embodiment of FIG. 1.

In FIG. 1 there are partially shown an upper plate 1 and a lower plate 2 of a press, one of said plates being movable.

A pair of endless conveyor chains 3 passes on both sides of said plates. The chains carry therebetween clamp or grip bars 4 adapted to engage and transport the sheets to be worked.

The drive of said chains is effected by means of a pair of sprocket wheels 5 mounted on a common shaft 6.

Loosely turning at the end of said shaft 6 is a pinion 7 meshing with a toothed segment 8 which, in turn, effects a rocking motion. Owing to this fact, the pinion 7 rotates first in one direction and then in the other.

Rotation in the direction of the arrow 9 corresponds to a conveying direction in the direction of displacement 10 of the chains. In the opposite direction, the pinion 7 turns idly on the shaft, and the chains are not driven.

This result is achieved by imparting to a shaft 11, which carries a fork 12, a rocking motion owing to which said fork causes axial displacement of a coupling sleeve located on the shaft 6, behind the pinion 7, and arranged in such a manner that the shaft 6 is driven in one direction of rotation of the segment and is free at other times.

Such a mechanism is described in detail in Swiss Patent 219,422 and forms no part of the present invention.

The drive of the toothed segment 8 is obtained through the intermediary of a connecting rod 13 which is articulately connected to said segment at 14.

In the past the reciprocating motion of the connecting rod controlling the toothed segment was obtained by articulately connecting the free end of said connecting rod to a crank arm which underwent rotary motion at uniform speed.

This mode of driving makes it necessary to restrict the operation on the basis of the motion of the crank. Experience has shown that this motion of the crank is not suited to effect the accelerations and decelerations of the chains and, thereby, of the conveying of the sheets corresponding to the most efficient output of the device, and in particular to high production speeds.

The present invention contemplates the elimination of this disadvantage by placing the drive of the toothed segment under the control of at least one cam positively effecting the rocking motions of said segment.

When compared with the crank, the cam brings about the advantages of permitting a drive which is a function which can be determined by the profile of the cam.

The toothed segment 8 oscillates about a fixed point 15 due to the action of the connecting rod 13 and the free end of the latter is articulately connected at 16 to a lever 17 which rotates about a fixed point 18.

Between said fixed point and the articulate connection 16, said lever carries a friction roller 19 in peripheral contact with a cam 20 arranged on a driving shaft 21.

The other end of the lever has an arm 22, at the end of which is a second roller 23 in peripheral contact with a second cam 24, which is also rigidly fixed on the driving shaft 21.

The cam 20, by lifting the roller 19, pushes the connecting rod 13 upwardly and positively drives the segment 8 in the direction of the arrow 25, a motion which corresponds to the drive of the chains 3, i.e., to the conveying of the sheets to be worked.

In FIG. 1 of the drawing, the segment is shown at the end of the work stroke, having been rocked to the extreme right.

By pushing back the roller 23, the cam 24 causes a reverse motion, i.e., an idle return motion of the segment, the coupling between the pinion 7 and the sprocket wheels 5 being then released. This drive is also positive.

It is obvious that the two cams 20 and 24 must be profiled in such a manner that the two motions caused by said cams take place without there being any play between the cams and their respective rollers.

However, in order to guard against the possibility of such play, the arm 22, carrying the roller causing the idle return motion of the segment 8 (a motion which requires only little force), is articulately connected to the lever 25 and subjected to the action of a restoring spring 26 which serves the purpose of insuring at all times that the roller 23 is applied against the peripheral surface of the controlling cam 24.

It is understood that the two cams can be replaced with a single cam controlling a single roller or two rollers in an appropriately profiled groove or track. However, such cams are somewhat more difficult to machine and, therefore, more expensive.

However, such an arrangement has the advantage of simplicity as will become evident from a consideration of FIG. 2.

Therein is shown the rod 13 which is identical to that of FIG. 1. At the lower end of rod 13 is a shaft 30 on which are mounted rollers 31, 32. The rollers 31, 32 are in respective contact with corresponding cam surfaces 33, 34 formed in a common track 35. Due to this arrangement, any play at the end of rod 13 is virtually eliminated. The cam surfaces 33, 34 are formed in a single cam member 36 which is mounted on a rotatable shaft in the same manner as cams 20, 24. The drive of the segment 8 will be the same for the arrangement in FIG. 2 as that in FIG. 1.

While the arrangement in FIG. 2 is also possible with a single roller, it will be evident that some play may exist in the rod 13.

It is obvious from the foregoing that the embodiments of the invention lend themselves readily to obtain, in the most judicious manner, the desired movement for conveying the sheets to be worked.

What is claimed is:

1. A drive mechanism for the chains of a press adapted for transporting sheets one by one, said mechanism comprising means for advancing the chains stepwise including a pinion for driving the chains, a pivotable toothed segment in mesh with the pinion for driving said pinion in rotation in alternate opposite directions during active and idle strokes and means for pivotably moving the toothed segment in opposite directions at respectively controlled rates to control the drive of the pinion during its active and idle strokes, the latter means comprising a rod coupled to the toothed segment to drive the same, means coupled to the rod and including roller means, and cam means in peripheral contact with said roller means to drive the same and the rod thereby in opposite directions such that the toothed segment is positively driven at controlled rates in opposite directions.

2. A drive mechanism as claimed in claim 1, wherein said roller means comprises a pair of rollers.

3. A drive mechanism as claimed in claim 1, wherein said means coupled to the rod comprises a lever arrangement, said roller means comprising a pair of rollers, said cam means including first and second cams in peripheral contact with a respective roller.

4. A drive mechanism as claimed in claim 1, wherein said cam means comprises a single cam member having a cam surface in contact with said roller means.

5. A drive mechanism as claimed in claim 2, wherein said cam means comprises a single cam member having a pair of cam surfaces therein, said rollers each being in peripheral contact with a corresponding cam surface thereby eliminating any play between the rod and the cam surfaces.

6. A drive mechanism as claimed in claim 3, wherein said lever arrangement is connected for pivotal movement about a fixed axis, said lever arrangement comprising a pair of pivotally connected levers, one of which is connected to said rod, each lever supporting a respective roller.

7. A drive mechanism as claimed in claim 6, wherein said rod drives said segment in one direction in a working stroke while driving the segment in the reverse direction in an idle stroke, said one lever being connected for pivotal movement about said fixed axis and being pivotally moved upwards during the working stroke to assume an approximately horizontal position at the end of such stroke after which said one lever is lowered during the idle stroke.

8. A drive mechanism as claimed in claim 7, wherein said lever arrangement comprises means between said levers resiliently acting on the other of said levers to urge the roller thereon against the associated cam.

9. A drive mechanism as claimed in claim 3, wherein the lever arrangement comprises first and second pivotally connected levers, each lever supporting a respective roller, one of said cams acting on the associated roller and lever to displace the rod in a first direction corresponding to the active stroke of the tooth segment while the other of the cams acts on the associated roller and lever to displace the rod in an opposite direction corresponding to the idle stroke of the tooth segment, means supporting the lever which is associated with said one cam for pivotal movement about a fixed axis, the latter lever being pivotally connected to said rod, and means acting on the other of said levers to resiliently urge the roller thereon against the associated cam.

10. A drive mechanism as claimed in claim 5, wherein said rollers are axially aligned in adjacent relation and said cam member has a common track which defines said cam surfaces.

References Cited

UNITED STATES PATENTS

| 1,117,749 | 11/1914 | Adrian | 74—53 |
| 2,692,509 | 10/1954 | Gibson | 74—53 |
| 2,799,337 | 7/1957 | Arcus | 74—53 |
| 2,969,692 | 1/1961 | Pfarrwaller | 74—53 |
| 3,207,108 | 9/1965 | Comerio | 74—53 |

FRED C. MATTERN, Jr., *Primary Examiner.*

W. S. RATLIFF, *Assistant Examiner.*